United States Patent
Adachi et al.

(10) Patent No.: US 9,580,778 B2
(45) Date of Patent: Feb. 28, 2017

(54) MANUFACTURING METHOD FOR ELECTRIC FURNACE STEEL FOR CARBURIZING WITHOUT MO ADDITION

(71) Applicant: AICHI STEEL CORPORATION, Tokai-shi (JP)

(72) Inventors: Yuji Adachi, Aichi (JP); Naoki Fukuda, Aichi (JP)

(73) Assignee: AICHI STEEL CORPORATION, Tokai-shi (JP)

( * ) Notice: Subject to any disclaimer, the term of this patent is extended or adjusted under 35 U.S.C. 154(b) by 55 days.

(21) Appl. No.: 14/334,801

(22) Filed: Jul. 18, 2014

(65) Prior Publication Data

US 2015/0023833 A1    Jan. 22, 2015

(30) Foreign Application Priority Data

Jul. 19, 2013  (JP) ................. 2013-150388
May 29, 2014  (JP) ................. 2014-111410

(51) Int. Cl.

| | |
|---|---|
| *C22C 38/44* | (2006.01) |
| *C22C 38/42* | (2006.01) |
| *C22C 38/06* | (2006.01) |
| *C22C 38/04* | (2006.01) |
| *C22C 33/04* | (2006.01) |
| *C22C 38/00* | (2006.01) |
| *C22C 38/54* | (2006.01) |
| *C22C 38/02* | (2006.01) |
| *C22C 38/20* | (2006.01) |
| *C22C 38/22* | (2006.01) |
| *C22C 38/32* | (2006.01) |
| *C23C 8/22* | (2006.01) |
| *C21C 5/52* | (2006.01) |

(52) U.S. Cl.
CPC ............ *C22C 38/001* (2013.01); *C22C 33/04* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/32* (2013.01); *C22C 38/42* (2013.01); *C22C 38/44* (2013.01); *C22C 38/54* (2013.01); *C23C 8/22* (2013.01); *C21C 5/5211* (2013.01); *Y02P 10/216* (2015.11)

(58) Field of Classification Search
CPC ......... C21C 7/0006; C22C 1/02; C22C 38/04; C22C 38/06; C22C 38/001; C22C 38/18; C22C 38/20; C22C 38/22; C22C 38/40; C22C 38/42; C22C 38/44; C22C 33/04
See application file for complete search history.

(56) References Cited

U.S. PATENT DOCUMENTS

2013/0343949 A1    12/2013    Fujimatsu et al.

FOREIGN PATENT DOCUMENTS

| JP | 2001-234275 A | 8/2001 |
|---|---|---|
| JP | 2009-249684 | 10/2009 |
| JP | 2009-249685 | 10/2009 |
| JP | 2010-180455 A | 8/2010 |
| JP | 2011-26688 | 2/2011 |
| JP | 2011-179048 A | 9/2011 |
| JP | 2012-197472 A | 10/2012 |
| JP | 2013-108144 A | 6/2013 |

OTHER PUBLICATIONS

Office Action issued Oct. 14, 2014 in Japanese Patent Application No. 2014-111410 (with English language translation).

*Primary Examiner* — George Wyszomierski
*Assistant Examiner* — Tima M McGuthry Banks
(74) *Attorney, Agent, or Firm* — Oblon, McClelland, Maier & Neustadt, L.L.P.

(57) ABSTRACT

An electric furnace steel contains, by mass %, C: 0.12 to 0.28%, Si: equal to or less than 0.15%, Mn: 0.65 to 0.95%, P: equal to or less than 0.035%, S: equal to or less than 0.035%, Cr: 1.35 to 1.90%, Al: 0.020 to 0.050%, and N: 0.0080 to 0.0230%. A scrap material is selected such that Cu, Ni, and Mo that derive from the scrap material and are thus contained as impurities in the electric furnace steel satisfy Expression 1. The electric furnace steel further contains Fe and unavoidable impurities as a remainder thereof. Accordingly, the electric furnace steel can secure carburizing quality equivalent to or higher than that of Cr—Mo steel, and can have properties equivalent to or higher than that of Cr—Mo steel, without adding Mo.

$([Cu]+2\times[Ni])^{0.76}\times[Mo] \geq 0.0040$     Expression 1:

3 Claims, No Drawings

MANUFACTURING METHOD FOR ELECTRIC FURNACE STEEL FOR CARBURIZING WITHOUT MO ADDITION

CROSS-REFERENCES TO RELATED APPLICATIONS

This application claims priority to Japanese patent applications no. 2013-150388 filed on Jul. 19, 2013 and no. 2014-111410 filed on May 29, 2014, the contents of which are entirely incorporated herein by reference.

BACKGROUND OF THE INVENTION

Field of the Invention

The present invention relates to an electric furnace steel for carburizing provided with carburizing quality equivalent to that of Cr—Mo steel without Mo addition and a manufacturing method for the electric furnace steel. The "electric furnace steel" means a steel manufactured according to a method of manufacturing steel using an electric furnace (hereinafter, referred to as "electric furnace method" as appropriate).

Description of the Related Art

Steel parts such as gears used for automobiles, industrial machines, and the like are required to have secured fatigue strength and abrasion resistance, in order to enable the steel parts to be used without replacement while receiving drive force from an engine and the like for a long period. Hence, alloy steel such as SCr and SCM having a carbon content of approximately 0.20% is used for conventional parts required to have fatigue strength and abrasion resistance, and a carburizing process that is a surface hardening process is performed thereon, whereby strength necessary for use is secured.

Normally, a Mo-added SCM material is used particularly for parts whose strength is strictly required. This is because Mo is an element that can improve hardenability while suppressing occurrence of an incomplete quenched structure of carburized surface, and Mo-added steel is thus effective to secure necessary hardenability regardless of part shapes and to manufacture parts having excellent strength.

However, in recent years, extreme fluctuations in price of raw materials necessary to manufacture special steel, such as scraps and ferroalloys that are raw materials of electric furnace steel, frequently occur. Fluctuations in price of ferromolybdenum necessary for Mo addition are no exception. Accordingly, in preparation for an extreme rise in price of ferromolybdenum, it is necessary to develop and prepare steel for carburizing that can secure properties equivalent to that of an SCM material without relying on Mo addition.

For example, Patent Document 1 describes a case-hardened steel that is developed with an object to secure bending fatigue strength and pitching strength equivalent to those of SNCM220H and SCM420H even in the case of avoiding containing Ni and Mo (expensive elements) as much as possible.

In Patent Document 1, in order to achieve this object, a deterioration of hardenability caused by reducing Ni and Mo contents is compensated for by making the component balance of Cr, Si, and Mn proper. Moreover, Patent Document 1 founds out that, in order to prevent bending fatigue strength and pitching strength from decreasing and minimize generation of coarse MnS that causes breaks during hot working and cold forging, it is important to make the balance of the Mn and S contents proper. Hence, coarse MnS generation is suppressed by performing such control that $30 \leq Mn/S \leq 150$ is satisfied. Further, Patent Document 1 proposes that a problem that carburized abnormal layers such as an intergranular oxidized structure and an incomplete quenched structure are made deeper by avoiding adding Ni and Mo as much as possible is solved by setting the Cr, Si, and Mn contents to $0.7 \leq Cr/(Si+2Mn) \leq 1.1$.

Moreover, Patent Document 2 describes a case-hardened steel that secures properties equivalent to that of Mo-added steel without adding Mo, even in the case of a rise in price of ferromolybdenum. In general, in order to suppress a deterioration of hardenability caused by a decrease in Mo, it is necessary to increase C, Mn, and Cr that are other hardenability improving elements than Mo, or add B that is another hardenability improving element. Unfortunately, if these elements are simply increased such that the hardenability becomes equivalent to that of the Mo-added steel, an incomplete quenched structure of carburized surface increases, and troostite in a carburized layer increases. Hence, it is difficult to secure properties equivalent to that of the Mo-added steel.

In view of the above, in Patent Document 2, the content of B, which is normally regarded as an impurity and is not particularly controlled, is strictly controlled, and the upper limit of B is set to be less than 0.0002%. This can suppress troostite generation in the carburized layer even without adding Mo. Further, Patent Document 2 discloses that the hardenability can be secured by satisfying Cr %−(Si %+Mn %+Cu %+Ni %+Mo %)≥0.30%.

DESCRIPTION OF THE RELATED ART

Patent Document 1: JP-A-2009-249684
Patent Document 2: JP-A-2011-26688

SUMMARY OF THE INVENTION

Unfortunately, the above-mentioned conventional techniques have the following problems.

In Patent Document 1, although the steel is designed so as to avoid containing Mo as much as possible, Mo is still added such that the Mo content becomes 0.04 to 0.10%, the hardenability is enhanced by Mo, the surface hardness, the hardened layer depth, and the core part hardness after carburizing and quenching are improved, and the strength of carburized parts is secured. Accordingly, although the amount of added Mo is small, expensive Mo is still added to the steel of Patent Document 1, and hence Patent Document 1 does not secure strength equivalent to that of an SCM material without adding Mo at all.

Moreover, in Patent Document 2, the upper limit of the B content is strictly controlled to be less than 0.0002%, whereby troostite generation in the carburized layer is suppressed even without adding Mo. However, in order to manufacture steel having the B content of less than 0.0002%, it is necessary to extremely strictly control B contained in raw materials. Hence, it may be possible to easily manufacture steel according to a blast furnace method in which iron ore is used as raw materials and a blast furnace is used, whereas it is extremely difficult to manufacture steel according to an electric furnace method in which scraps are used as raw materials. In the electric furnace method, if steel is manufactured without particularly controlling impurities contained in the raw materials, the B content may be approximately 0.0005% at the maximum as an impurity even without adding B. Hence, in order to make the B content less than 0.0002%, it is necessary to strictly control selection of scraps themselves as the raw materials, so that it is difficult to steadily manufacture the steel according to the electric furnace method.

Steel for carburizing is used in many cases for machine parts that are repetitively used in a high strength load state, such as gears, and hence carburizing quality (surface hardness, a carburized surface intergranular oxidized structure (a carburized abnormal layer), an amount of carburized layer troostite, a carburizing depth, and internal hardness) is extremely important. Hence, it is extremely important to enable mass production of steel that can secure strength quality equivalent to that of an SCM material even without adding Mo at all.

One aspect of the present invention is an electric furnace steel for carburizing without Mo addition that is manufactured by an electric furnace using a scrap material as a main raw material thereof, the electric furnace steel containing, by mass %, C: 0.12 to 0.28%, Si: equal to or less than 0.15%, Mn: 0.65 to 0.95%, P: equal to or less than 0.035%, S: equal to or less than 0.035%, Cr: 1.35 to 1.90%, Al: 0.020 to 0.050%, and N: 0.0080 to 0.0230%, the scrap material being selected such that Cu, Ni, and Mo that are derived from the scrap material and are contained as impurities in the electric furnace steel satisfy Expression 1, $$([Cu]+2\times[Ni])^{0.76}\times[Mo] \geq 0.0040 \qquad \text{Expression 1:}$$

(where [Cu], [Ni], and [Mo] respectively mean contents (mass %) of Cu, Ni, and Mo in the steel), the contents of Cu, Ni and Mo are restricted to Cu: equal to or less than 0.30%, Ni: equal to or less than 0.25% and Mo: equal to or less than 0.06%; and the electric furnace steel further containing Fe and unavoidable impurities as a remainder thereof.

Another aspect of the present invention is a manufacturing method for an electric furnace steel for carburizing without Mo addition that is manufactured by an electric furnace using a scrap material as a main raw material thereof, having:

selecting the scrap material such that Cu, Ni, and Mo that are derived from the scrap material and are contained as impurities in the electric furnace steel satisfy Expression 1, $$([Cu]+2\times[Ni])^{0.76}\times[Mo] \geq 0.0040 \qquad \text{Expression 1:}$$

(where [Cu], [Ni], and [Mo] respectively mean contents (mass %) of Cu, Ni, and Mo in the steel);

melting the scrap material by the electric furnace, and adding adjusting alloys for other component without intentionally adding Cu, Ni, and Mo; and manufacturing the electric furnace steel such that: the electric furnace steel contains, by mass %, C: 0.12 to 0.28%, Si: equal to or less than 0.15%, Mn: 0.65 to 0.95%, P: equal to or less than 0.035%, S: equal to or less than 0.035%, Cr: 1.35 to 1.90%, Al: 0.020 to 0.050%, and N: 0.0080 to 0.0230%; Cu, Ni, and Mo that are contained as the impurities in the electric furnace steel satisfy Expression 1; and the electric furnace steel further contains Fe and unavoidable impurities as a remainder thereof.

In the manufacturing electric furnace steel, normally, the contents of elements that derive from a scrap material and the like and mix into the steel as impurities are not controlled unless the elements hinder original operations and effects of the steel. Moreover, for components among the impurities (such as Cu, Ni, and Mo) difficult to remove at the time of manufacturing steel, a reduction in contents thereof is extremely difficult. Accordingly, even if such elements whose content reducing control is difficult are contained as impurities and have some kind of influence as a result, removal of the influence has been considered to be difficult. Moreover, even if such elements have some kind of influence, when a new steel type according to an electric furnace method is studied, normally, the contents of impurities in raw materials are not studied in detail unless any harmful influence is particularly clearly known.

Unlike conventional cases, the present invention does not ignore but actively utilizes effects produced by Cu, Ni, and Mo that derive from a scrap and are thus contained as impurities in the manufactured steel. Note that, if strict scrap selection is necessary as in Patent Document 2 in order to actively utilize elements to be originally treated as impurities, actual manufacturing becomes more complicated and difficult to realize. That is, in the case of controlling elements difficult to be removed at the time of manufacturing steel, it is necessary to use only expensive scraps having low contents of the elements to be controlled, according to such a method as described in Patent Document 2 in which the upper limits of impurities are controlled.

In view of the above, according to the present invention, scraps are classified into a plurality of types in accordance with the content levels of Cu, Ni, and Mo, and scraps are selected while mixing-in of impurities is tolerated within a range within which the content ratios of the three elements Cu, Ni, and Mo satisfy Expression 1, whereby it is possible to manufacture steel basically without controlling the upper limits of the impurities. That is, the present invention is intended to obtain desired effects by actively utilizing effects produced by containing the three elements as impurities. Hence, it is possible to manufacture steel using scraps having high contents of the three elements to some degree. It is further easier to manufacture steel in comparison with that of Patent Document 2.

The present invention actively utilizes Cu, Ni, and Mo that derive from a scrap and thus mix in as impurities, to thereby obtain an effect of assisting an improvement in hardenability. In consideration of this effect, the contents of Mn and Cr that are additive elements are each adjusted to an optimal range for generation suppression of troostite and an incomplete quenched structure in a carburized surface, while necessary hardenability is secured. As a result, the present invention can provide an electric furnace steel for carburizing that can secure excellent carburizing quality equivalent to or higher than that of an SCM material that is steel to which Mo is actively added, even without intentionally adding Mo and strictly controlling the upper limit of the B content.

Here, the troostite in the carburized layer (hereinafter, referred to as troostite) is completely different from an incomplete quenched structure that is observed on the surface of a steel part in the case of performing a normal gas carburizing process, and means fine pearlite that precipitates mainly in the carburized layer at the time of cooling in quenching after the carburizing process. Note that the incomplete quenched structure is a structure generated in the following manner: oxygen in a carburizing gas atmosphere is diffused into a steel material from the surface thereof, and forms oxides together with alloy elements such as Si, Mn, and Cr contained in the material; consequently, solid solution alloy elements such as Si and Mn become lacking around the oxides; and the hardenability deteriorates.

Note that, in an example of Patent Document 2, steels containing Cu, Ni, and Mo as impurities are prepared and evaluated with regard to the troostite. Then, Patent Document 2 describes that the troostite can be suppressed by adding Cr and other quenching elements in a balanced manner and suppressing B, without sufficiently considering influences of these elements Cu, Ni, and Mo contained as impurities.

In Patent Document 2, the Mo content of each steel evaluated in the example is only 0 or 0.01%, and influences of the content of Mo contained as an impurity are not sufficiently studied. Then, in Patent Document 2, basically, the troostite is suppressed by effects produced by adding Cr and other quenching elements in a balanced manner, and a relational expression therefor is created.

Meanwhile, an influence on troostite suppression produced by not only Mo but also Cu and Ni contained as impurities is further studied. As a result, in the electric furnace method, it is found out that Mo can be contained as an impurity up to approximately 0.06% (for example, chromium steel compliant to SAE standards is tolerated to contain Mo as an impurity up to 0.06%), and it is found out that a troostite suppression effect produced by containing Mo at 0.02% or more, which is not evaluated in the example of Patent Document 2, is extremely high. Further, it is also found out that, similarly to utilization of Mo alone, a troostite suppressing effect produced by utilizing Cu and Ni contained as impurities in combination with Mo is higher than expected. Then, it is confirmed that, if effects produced by combining these impurities are utilized, the troostite can be suppressed to a level equivalent to that of an SCM material, and properties equivalent to that of an SCM material can be obtained without suppressing B to be less than 2 ppm, resulting in completion of the present invention. A relational expression in which the effects produced by combining these impurities are quantitatively represented is Expression 1 given in the present application.

According to the present invention, steel is manufactured by adjusting content of Cu, Ni, and Mo that derive from a scrap and thus mix in as impurities such that the content becomes appropriate through scrap selection or the like. Hence, in the case of manufacturing steel without any scrap selection, steels that can satisfy Expression 1 cannot be stably manufactured. Moreover, the present invention can provide an electric furnace steel that can secure properties equivalent to that of an SCM material even without actively adding Cu, Ni, and Mo, that is, without Mo addition.

As has been described above, the present invention proposes an electric furnace steel that can secure properties equivalent to that of an SCM material without adding Mo at all. Hence, even in the case of a rise in price of ferromolybdenum that is a ferroalloy necessary for Mo addition, the present invention can provide an inexpensive steel material excellent in properties without Mo addition, and thus can easily offer Mo-saving measures strongly desired by users.

DETAILED DESCRIPTION OF THE PREFERRED EMBODIMENT

Reasons for defining the upper and lower limits of each component of an electric furnace steel for carburizing without Mo addition are described below.

C (carbon): 0.12 to 0.28%

C is an element essential to secure necessary internal hardness after a carburizing process, and is also an element that enhances the hardenability, and hence the C content needs to be equal to or more than 0.12%. However, if the C content is excessively increased, although the internal hardness can be enhanced by an increase in hardenability, the material hardness before the carburizing process increases, and the life of a tool used for machine processing that is performed before the carburizing process to form steel into a predetermined shape becomes significantly shorter. Accordingly, the upper limit of the C content is set to 0.28%.

Si (silicon): equal to or less than 0.15%

Si has an effect of enhancing a resistance to temper softening, and has an effect of preventing a decrease in hardness caused by a rise in temperature in the case of the use as a gear, and hence Si may be actively added to the steel for carburizing. However, in the case where the largest object is to utilize effects of Mo contained as an impurity and enable securing equivalent properties even without adding Mo, an effect of reducing an incomplete quenched structure of carburized surface cannot be expected as much as the case of actively adding Mo. Hence, it is necessary to reduce Si as much as possible, because Si is susceptible to oxidation in the carburizing process and likely to promote generation of the incomplete quenched structure. Accordingly, in the present invention, the upper limit of the Si content is set to 0.15%.

Mn (manganese): 0.65 to 0.95%

Mn is an element that is necessary to secure necessary hardenability and internal hardness and to suppress troostite in the carburized layer, and hence the Mn content needs to be equal to or more than 0.65%. However, Mn is an element susceptible to oxidation, and thus is oxidized during the carburizing process to cause generation of an incomplete quenched structure of carburized surface. Moreover, if Mn is excessively contained, the machinability decreases, and the machine processing before the carburizing process becomes difficult. Accordingly, the upper limit of the Mn content is set to 0.95%.

P (phosphorus): equal to or less than 0.035%

P is an element that is likely to be segregated in an austenite grain boundary, and is an element that causes a decrease in bending fatigue strength if such segregation occurs. P is an element that is unavoidably contained to a small extent in manufacturing, but the P content can be suppressed to be low by, for example, improving a steel manufacturing process. Accordingly, the upper limit of the P content is set to 0.035%. Desirably, the upper limit of the P content is equal to or less than 0.020%.

S (sulfur): equal to or less than 0.035%

S is well known as an element effective to improve the machinability. However, if S is contained to a large extent, the amount of sulfide non-metal inclusion increases, and this becomes a starting point of fatigue failure, and causes a decrease in fatigue strength. Accordingly, the upper limit of the S content is set to 0.035%.

Cr (chromium): 1.35 to 1.90%

Cr is an element effective to improve the hardenability, and is an element essential to compensate for a deterioration of hardenability caused by not adding Mo. Moreover, Cr is an element having a larger effect of suppressing troostite generation in the carburized layer than that of Mn. Accordingly, it is necessary to make the Cr content slightly higher than that of SCr steel compliant to JIS, and hence the lower limit of the Cr content is set to 1.35%. However, if Cr is excessively contained, suppression of an incomplete quenched structure of carburized surface becomes difficult, the hardness before the carburizing process increases, and the machinability decreases, so that the machine processing becomes difficult. Accordingly, the upper limit of the Cr content is set to 1.90%, and preferably set to less than 1.80%.

Note that Cr may react with oxygen in atmosphere gas during the carburizing process, to be thereby oxidized. If the Cr content is increased, there is fear that the incomplete quenched structure may increase. Because the amount of Si greatly related to generation of the incomplete quenched structure is reduced as much as possible, this fear can be dealt with by not excessively increasing Cr on the condition that necessary hardenability can be secured.

Al (aluminum): 0.020 to 0.050%

Al is an element that is bonded to N to form AlN and is effective not only to make crystal grains after the carburizing process finer because of a pinning effect but also to suppress grain coarsening. Accordingly, the Al content needs to be 0.020% at the minimum. However, if the Al content increases, the effects are saturated, and the amount of alumina non-metal inclusion increases, resulting in a decrease in fatigue strength. Accordingly, the upper limit of the Al content is set to 0.050%.

N (nitrogen): 0.0080 to 0.0230%

N is an element that is bonded to Al to form AlN and is effective to make crystal grains after the carburizing process finer and suppress grain coarsening. Because a large amount of N exists in the atmosphere, N is an element that is unavoidably contained as an impurity in manufacturing in the case of atmosphere melting. For the above-mentioned reason, the lower limit of the N content is controlled in manufacturing, and N is intentionally added as needed. Accordingly, the lower limit of the N content is set to 0.0080%. However, if N is excessively contained, the effects are saturated. Accordingly, the upper limit of the N content is set to 0.0230%.

$$([Cu]+2\times[Ni])^{0.76}\times[Mo]\geq 0.0040, \quad \text{Expression 1:}$$

where [Cu], [Ni], and [Mo] respectively mean the contents (mass %) of Cu, Ni, and Mo in the steel.

In order to utilize the troostite suppressing effect of Cu, Ni, and Mo as impurities and enable generation suppression of an incomplete quenched structure of carburized surface while suppressing the amounts of added Mn and Cr, it is necessary to select raw scraps such that the Cu, Ni, and Mo contents in a finally obtained electric furnace steel satisfy Expression 1.

As the contents of Cu, Ni, and Mo contained as impurities are higher, the suppression effect produced by Mn and Cr is higher, but Cu, Ni, and Mo are contained by controlling impurities, and are not actively added. The upper limits as impurities defined by JIS are Cu: equal to or less than 0.30% and Ni: equal to or less than 0.25%. Contents beyond the upper limits are not preferable, and Cu and Ni are hardly contained as impurities beyond the upper limits thereof, in the first place. Although the upper limit of Mo as an impurity in the case of using scraps as raw materials is approximately 0.06%, the upper limit thereof is not particularly defined by JIS. Note that, in the case where impurities are excessively contained, fluctuations in quality and the like can occur industrially, and hence the upper limits of Cu, Ni, and Mo are respectively set to Cu: equal to or less than 0.30%, Ni: equal to or less than 0.25%, and Mo: equal to or less than 0.06% as described above.

Various methods can be adopted as a specific method of selecting scraps as long as the scraps can be combined with one another such that the contents of Cu, Ni, and Mo as impurities in chemical components of a finally obtained electric furnace steel satisfy Expression 1. A specific example thereof is described. The impurity level is different for each method of obtaining scraps. Hence, scraps are first classified and stored for each method of obtaining scraps. Then, the content levels of Cu, Ni, and Mo are determined for each classified group, and are stored as three-element content data. At the time of scrap selection, the weight of scraps to be adopted from each classified group is determined using the three-element content data such that Cu, Ni, and Mo in the chemical components of the finally obtained electric furnace steel satisfy Expression 1, and the adopted scraps are selected as raw materials.

According to the electric furnace steel for carburizing of the present invention, C, Mn, and Cr are tightly controlled, the component balance is made proper with the avoidance of adding Si as much as possible, and the effects of Cu, Ni, and Mo contained as impurities are utilized. As a result, components of the electric furnace steel for carburizing of the present invention are adjusted such that a deterioration of hardenability caused by not adding Mo is compensated, whereby the hardenability is secured. Accordingly, if the depth of incomplete quenched structure and the troostite precipitation amount after the carburizing process are made equivalent to those of Cr—Mo steel, even Cr steel (Mo-saving steel) can be provided with properties equivalent to or higher than that of an SCM material.

EXAMPLE

Next, effects of the present invention are clarified by giving an example below.

Table 1 shows chemical components of test materials used in the example. Among the test materials, Steels No. 1 to No. 5 (a carbon content corresponding to that of SCM415), Steels No. 8 to No. 12 (a carbon content corresponding to that of SCM420), and Steels No. 28 to No. 32 (a carbon content corresponding to that of SCM425) are invention steels that satisfy conditions defined in the present invention. In comparison, Steels No. 13 to No. 25 are comparative steels (a carbon content corresponding to that of SCM420) which do not satisfy some of the conditions defined in the present invention. Moreover, Steels No. 6, No. 7, No. 26, No. 27, No. 33, and No. 34 are respectively SCM415, SCr415, SCM420, SCr420, SCM425, and chromium steel containing C at 0.25% that are conventional steels.

TABLE 1

| | Steel No. | C | Si | Mn | P | S | Cu | Ni | Cr | Mo | Al | N | B | (C—N: mass %; B: mass ppm) Relational expression (Expression 1) |
|---|---|---|---|---|---|---|---|---|---|---|---|---|---|---|
| Invention steel | 1 | 0.14 | 0.06 | 0.65 | 0.005 | 0.004 | 0.02 | 0.04 | 1.39 | 0.06 | 0.032 | 0.0155 | 2 | 0.0071 |
| | 2 | 0.15 | 0.09 | 0.81 | 0.014 | 0.012 | 0.07 | 0.08 | 1.55 | 0.02 | 0.022 | 0.0084 | 3 | 0.0047 |
| | 3 | 0.17 | 0.13 | 0.88 | 0.029 | 0.025 | 0.16 | 0.04 | 1.75 | 0.03 | 0.047 | 0.0180 | 2 | 0.0088 |
| | 4 | 0.12 | 0.11 | 0.81 | 0.016 | 0.017 | 0.11 | 0.08 | 1.36 | 0.02 | 0.030 | 0.0210 | 2 | 0.0057 |
| | 5 | 0.17 | 0.09 | 0.71 | 0.008 | 0.009 | 0.18 | 0.13 | 1.85 | 0.01 | 0.026 | 0.0168 | 3 | 0.0041 |
| SCM415 | 6 | 0.15 | 0.25 | 0.81 | 0.015 | 0.016 | 0.11 | 0.06 | 1.11 | 0.16 | 0.031 | 0.0120 | 2 | — |
| SCR415 | 7 | 0.15 | 0.24 | 0.78 | 0.017 | 0.015 | 0.12 | 0.06 | 1.07 | 0.02 | 0.028 | 0.0118 | 3 | — |
| Invention steel | 8 | 0.18 | 0.05 | 0.81 | 0.006 | 0.005 | 0.05 | 0.03 | 1.36 | 0.05 | 0.036 | 0.0150 | 2 | 0.0073 |
| | 9 | 0.20 | 0.10 | 0.65 | 0.015 | 0.012 | 0.07 | 0.08 | 1.57 | 0.02 | 0.025 | 0.0082 | 3 | 0.0047 |

TABLE 1-continued (C—N: mass %; B: mass ppm)

|  | Steel No. | C | Si | Mn | P | S | Cu | Ni | Cr | Mo | Al | N | B | Relational expression (Expression 1) |
|---|---|---|---|---|---|---|---|---|---|---|---|---|---|---|
| Comparative steel | 10 | 0.23 | 0.07 | 0.86 | 0.030 | 0.025 | 0.08 | 0.05 | 1.85 | 0.04 | 0.045 | 0.0186 | 2 | 0.0085 |
|  | 11 | 0.19 | 0.10 | 0.79 | 0.018 | 0.017 | 0.11 | 0.08 | 1.38 | 0.02 | 0.032 | 0.0224 | 2 | 0.0057 |
|  | 12 | 0.21 | 0.10 | 0.71 | 0.007 | 0.008 | 0.18 | 0.13 | 1.75 | 0.01 | 0.029 | 0.0173 | 3 | 0.0041 |
|  | 13 | 0.20 | 0.18 | 0.82 | 0.016 | 0.015 | 0.11 | 0.08 | 1.65 | 0.02 | 0.033 | 0.0085 | 2 | 0.0057 |
|  | 14 | 0.21 | 0.10 | 1.01 | 0.014 | 0.016 | 0.11 | 0.08 | 1.55 | 0.02 | 0.032 | 0.0152 | 2 | 0.0057 |
|  | 15 | 0.20 | 0.11 | 0.60 | 0.020 | 0.014 | 0.08 | 0.05 | 1.85 | 0.04 | 0.036 | 0.0141 | 2 | 0.0085 |
|  | 16 | 0.22 | 0.08 | 0.66 | 0.025 | 0.014 | 0.11 | 0.08 | 1.95 | 0.02 | 0.029 | 0.0122 | 2 | 0.0057 |
|  | 17 | 0.21 | 0.07 | 0.75 | 0.015 | 0.021 | 0.16 | 0.04 | 1.28 | 0.03 | 0.027 | 0.0191 | 2 | 0.0088 |
|  | 18 | 0.21 | 0.10 | 0.71 | 0.012 | 0.012 | 0.02 | 0.01 | 1.56 | 0.05 | 0.031 | 0.0080 | 2 | 0.0035 |
|  | 19 | 0.19 | 0.09 | 0.75 | 0.017 | 0.015 | 0.03 | 0.02 | 1.70 | 0.03 | 0.029 | 0.0143 | 4 | 0.0031 |
|  | 20 | 0.21 | 0.11 | 0.82 | 0.021 | 0.008 | 0.08 | 0.03 | 1.46 | 0.02 | 0.047 | 0.0209 | 3 | 0.0037 |
|  | 21 | 0.18 | 0.13 | 0.86 | 0.014 | 0.015 | 0.05 | 0.03 | 1.77 | 0.02 | 0.039 | 0.0150 | 3 | 0.0029 |
|  | 22 | 0.20 | 0.10 | 0.85 | 0.016 | 0.014 | 0.16 | 0.08 | 1.60 | 0.01 | 0.032 | 0.0116 | 2 | 0.0034 |
|  | 23 | 0.22 | 0.05 | 0.69 | 0.013 | 0.016 | 0.10 | 0.04 | 1.53 | 0.01 | 0.036 | 0.0120 | 4 | 0.0022 |
|  | 24 | 0.20 | 0.13 | 0.92 | 0.012 | 0.018 | 0.05 | 0.03 | 1.39 | 0.02 | 0.038 | 0.0140 | 3 | 0.0029 |
|  | 25 | 0.21 | 0.10 | 0.85 | 0.014 | 0.015 | 0.15 | 0.10 | 1.44 | 0.01 | 0.028 | 0.0090 | 2 | 0.0035 |
| SCM420 | 26 | 0.20 | 0.25 | 0.78 | 0.015 | 0.014 | 0.11 | 0.05 | 1.10 | 0.17 | 0.036 | 0.0115 | 3 | — |
| SCR420 | 27 | 0.19 | 0.24 | 0.83 | 0.019 | 0.017 | 0.10 | 0.07 | 1.05 | 0.01 | 0.031 | 0.0128 | 4 | — |
| Invention steel | 28 | 0.24 | 0.07 | 0.67 | 0.005 | 0.005 | 0.05 | 0.03 | 1.36 | 0.05 | 0.030 | 0.0155 | 2 | 0.0073 |
|  | 29 | 0.25 | 0.09 | 0.80 | 0.015 | 0.013 | 0.08 | 0.05 | 1.57 | 0.04 | 0.024 | 0.0082 | 2 | 0.0085 |
|  | 30 | 0.27 | 0.14 | 0.89 | 0.030 | 0.024 | 0.16 | 0.04 | 1.78 | 0.03 | 0.048 | 0.0183 | 2 | 0.0088 |
|  | 31 | 0.24 | 0.11 | 0.80 | 0.015 | 0.014 | 0.18 | 0.13 | 1.40 | 0.01 | 0.031 | 0.0214 | 3 | 0.0041 |
|  | 32 | 0.28 | 0.09 | 0.71 | 0.006 | 0.008 | 0.11 | 0.08 | 1.87 | 0.02 | 0.027 | 0.0170 | 2 | 0.0057 |
| SCM425 | 33 | 0.25 | 0.25 | 0.81 | 0.015 | 0.016 | 0.11 | 0.06 | 1.11 | 0.16 | 0.031 | 0.0120 | 3 | — |
| 0.25C—SCr | 34 | 0.25 | 0.24 | 0.78 | 0.017 | 0.015 | 0.11 | 0.08 | 1.07 | 0.02 | 0.028 | 0.0118 | 2 | — |

Each test material shown in Table 1 is prepared in the following manner. That is, the scrap types and the scrap use ratios are determined such that the Cu, Ni, and No contents expected to be contained in a finally obtained electric furnace steel become target values, the selected scraps are used as base materials, and chemical components of the test material are adjusted by electric furnace melting. Moreover, although the B contents of chromium steel and chromium-molybdenum steel are hardly listed in normal cases, Table 1 shows the content of B contained as an impurity. Table 1 also shows the contents of Cu, Ni, and Mo, which are impurities in each invention steel but are actively utilized. Among these elements, values of Cu and Ni are based on Cu and Ni that are not actively added at all but are originally contained in the used scraps and are thus contained as impurities in the finally obtained electric furnace steel. Similarly, a value of Mo is based on Mo that is not actively added but is contained as an impurity, except for Steels No. 6, No. 26, and No. 33 that are SCM materials.

With the use of each test material having the components shown in Table 1, a test piece having a diameter of 30 mm was made through hot rolling and machine processing, and was subjected to a gas carburizing process under a condition of 950° C.×2.5 hours. The processed test piece was observed using an optical microscope, whereby the average precipitation area ratio of troostite in a range of a depth 0.5 mm from the surface and the average depth of incomplete quenched structure of carburized surface were measured. The results are shown in Table 2.

TABLE 2

|  | Steel No. | Troostite area ratio (%) | Depth of incomplete quenched structure of carburized surface (μm) |
|---|---|---|---|
| Invention steel | 1 | 3.9 | 17 |
|  | 2 | 5.5 | 21 |
|  | 3 | 4.7 | 25 |

TABLE 2-continued

|  | Steel No. | Troostite area ratio (%) | Depth of incomplete quenched structure of carburized surface (μm) |
|---|---|---|---|
|  | 4 | 5.1 | 23 |
|  | 5 | 6.1 | 24 |
| SCM415 | 6 | 6.5 | 26 |
| SCR415 | 7 | 15.9 | 32 |
| Invention steel | 8 | 4.1 | 26 |
|  | 9 | 4.1 | 14 |
|  | 10 | 2.8 | 27 |
|  | 11 | 3.9 | 25 |
|  | 12 | 4.6 | 17 |
| Comparative steel | 13 | 4.4 | 33 |
|  | 14 | 4.6 | 34 |
|  | 15 | 5.2 | 24 |
|  | 16 | 4.3 | 30 |
|  | 17 | 5.5 | 27 |
|  | 18 | 5.7 | 26 |
|  | 19 | 6.7 | 22 |
|  | 20 | 5.3 | 25 |
|  | 21 | 8.2 | 27 |
|  | 22 | 7.5 | 25 |
|  | 23 | 7.9 | 19 |
|  | 24 | 12.2 | 23 |
|  | 25 | 10.3 | 24 |
| SCM420 | 26 | 4.8 | 28 |
| SCR420 | 27 | 13.8 | 33 |
| Invention steel | 28 | 2.8 | 18 |
|  | 29 | 2.5 | 23 |
|  | 30 | 1.9 | 22 |
|  | 31 | 3.2 | 20 |
|  | 32 | 2.1 | 24 |
| SCM425 | 33 | 3.4 | 25 |
| 0.25C—SCr | 34 | 10.2 | 30 |

As is apparent from the results of the troostite precipitation area ratios of Cr steel and Cr—Mo steel having the same carbon content as each other (that is, Steels No. 6 and No. 7 (a carbon content of 0.15%), Steels No. 26 and No. 27 (a carbon content of 0.20%), and Steels No. 33 and No. 34 (a carbon content of 0.25%) that are conventional steels), an effect produced by containing Mo is extremely high, and the Cr—Mo steel is extremely lower in troostite precipitation area ratio than the Cr steel. Because troostite precipitation causes a decrease in fatigue strength, even in the case where Mo is not actively added, it is important to suppress the troostite precipitation area ratio to be equivalent to or less than that of the conventional Cr—Mo steel.

Here, it is known that the troostite precipitation area ratio tends to become lower as the carbon content becomes higher. Accordingly, in the present example, in order to make evaluations considering influences of the carbon content on carburizing quality, evaluation results were compared between Steels No. 1 to No. 5 (a carbon content of 0.13 to 0.17%) and SCM415 (Steel No. 6), between Steels No. 8 to No. 12 (a carbon content of 0.18 to 0.23%) and SCM420 (Steel No. 26), and between Steels No. 28 to No. 32 (a carbon content of 0.24 to 0.28%) and SCM425 (Steel No. 33). In this manner, it was evaluated whether or not each invention steel had carburizing quality equivalent to or higher than that of the corresponding SCM material. As a result, it could be confirmed that a troostite precipitation area ratio and a depth of incomplete quenched structure equivalent to or less than those of the corresponding SCM material were obtained for all the invention steels.

In comparison, for Steels No. 13 to No. 25 that were the comparative steels, any of the conditions defined in the present invention was not satisfied, and hence the carburizing quality thereof was lower than that of SCM420 (Steel No. 26) that was the SCM material having substantially the same carbon content.

More specifically, for Steels No. 13, No. 14, and No. 16, any of the contents of Si, Mn, and Cr that influenced the depth of incomplete quenched structure was higher, and hence the depths of incomplete quenched structure were larger. For Steels No. 15 and No. 17, any of the contents of Mn and Cr that were effective to reduce the troostite precipitation amount was lower, and hence the troostite precipitation area ratios thereof were higher. For Steels No. 18 to No. 25, the relational expression (Expression 1) was not satisfied, effects of Cu, Ni, and Mo that were actively utilized impurity elements could not be sufficiently utilized, and hence the troostite precipitation area ratios thereof were higher.

Note that, as described above, Patent Document 2 applied by the same applicant as that of the present application has already clarified a finding that, if the B content is controlled to be less than 2 ppm, troostite can be suppressed to be equivalent to or less than that of an SCM material. The present invention can provide a steel that is more improved in terms of manufacturing without using the finding of Patent Document 2, that is, can secure excellent carburizing quality without strictly controlling the upper limit of B. Accordingly, in the evaluations of the present example, test materials containing B at 2 ppm or more were intentionally selected and evaluated as the test materials.

As a result, Steels No. 18 to No. 25 that were the comparative steels insufficient in effects produced by utilizing Cu, Ni, and Mo as impurities could not secure carburizing quality equivalent to that of the corresponding SCM material. In comparison, it was confirmed that Steels No. 1 to No. 5, Steels No. 8 to No. 12, and Steels No. 28 to No. 32 that were the invention steels could obtain carburizing quality equivalent to or higher than that of the corresponding SCM materials, in spite of the fact that all the invention steels contained B at 2 ppm or more.

Accordingly, the present invention enables providing an electric furnace steel having equivalent properties without adding Mo and strictly controlling the B content, even in the case of a future rise in price of ferromolybdenum, and hence the present invention greatly contributes to the industry.

What is claimed is:

1. A manufacturing method for an electric furnace steel for carburizing, comprising the following components, in mass %:
C: 0.12 to 0.28%, Si: equal to or less than 0.15%, Mn: 0.65 to 0.95%, P: equal to or less than 0.035%, S: equal to or less than 0.035%, Cr: 1.35 to 1.90%, Al: 0.020 to 0.050%, and N: 0.0080 to 0.0230%, the electric furnace steel further comprising iron,
wherein the method is performed without Mo addition by employing an electric furnace with a scrap material as a main raw material thereof,
the method comprising:
selecting the scrap material such that Cu, Ni, and Mo that are derived from the scrap material and are contained as impurities in the electric furnace steel satisfy Expression 1, $$([Cu]+2\times[Ni])^{0.76}\times[Mo] \geq 0.0040 \quad \text{Expression 1:}$$

where [Cu], [Ni], and [Mo] respectively mean contents (mass %) of Cu, Ni, and Mo in the steel and wherein the selecting does not comprise controlling a content of B;
melting the scrap material by the electric furnace; and
adding adjusting alloys for components excluding Cu, Ni and Mo of the electric furnace steel without intentionally adding Cu, Ni, and Mo;
wherein
Cu, Ni, and Mo that are contained as the impurities in the electric furnace steel satisfy Expression 1; and
the contents of Cu, Ni and Mo are restricted to Cu: equal to or less than 0.30%, Ni: equal to or less than 0.25% and Mo: equal to or less than 0.06%.

2. The method of claim 1, wherein the electric furnace steel comprises B in a content of more than 2 ppm by mass.

3. The method of claim 1, wherein the electric furnace steel comprises B in a content of more than 2 ppm by mass to 4 ppm by mass.

* * * * *